United States Patent
Lecha et al.

(10) Patent No.: US 7,515,598 B2
(45) Date of Patent: Apr. 7, 2009

(54) CONFIGURABLE TRANSMIT AND RECEIVE SYSTEM INTERFACES FOR A NETWORK DEVICE

(75) Inventors: Eduard Lecha, Emeryville, CA (US); Carlos Calderon, Fremont, CA (US); Jesus Gonzalez, El Cerrito, CA (US)

(73) Assignee: Intel Corporation, Santa Clara, CA (US)

( * ) Notice: Subject to any disclaimer, the term of this patent is extended or adjusted under 35 U.S.C. 154(b) by 1075 days.

(21) Appl. No.: 10/282,453

(22) Filed: Oct. 29, 2002

(65) Prior Publication Data

US 2004/0081163 A1 Apr. 29, 2004

(51) Int. Cl.
*H04L 12/56* (2006.01)
*G06F 13/00* (2006.01)
*G11C 7/00* (2006.01)
*G11C 8/00* (2006.01)

(52) U.S. Cl. .................. 370/412; 711/100; 365/220; 365/230.03

(58) Field of Classification Search .................. None
See application file for complete search history.

(56) References Cited

U.S. PATENT DOCUMENTS

| | | | | |
|---|---|---|---|---|
| 5,117,395 A | * | 5/1992 | Hashimoto | 365/221 |
| 5,596,540 A | * | 1/1997 | Diem et al. | 365/221 |
| 5,828,617 A | * | 10/1998 | Knaack | 365/220 |
| 6,104,208 A | * | 8/2000 | Rangasayee | 326/40 |
| 6,421,351 B1 | * | 7/2002 | Morifuji | 370/429 |
| 6,430,103 B2 | * | 8/2002 | Nakayama et al. | 365/230.03 |
| 6,510,486 B1 | * | 1/2003 | Knaack et al. | 711/5 |
| 6,765,911 B1 | * | 7/2004 | Branstad et al. | 370/395.1 |
| 6,788,612 B2 | * | 9/2004 | Hsu et al. | 365/230.05 |
| 6,857,043 B1 | * | 2/2005 | Lee et al. | 711/109 |
| 6,952,752 B2 | * | 10/2005 | Katayama et al. | 711/103 |

FOREIGN PATENT DOCUMENTS

CN 1347229 5/2002

* cited by examiner

*Primary Examiner*—Chi H Pham
*Assistant Examiner*—Warner Wong
(74) *Attorney, Agent, or Firm*—Buckley, Maschoff & Talwalkar LLC

(57) ABSTRACT

According to some embodiments, an apparatus is provided comprising a plurality of transmit storage structures each being associated with a storage width, a write block, and a read block. The write block is to receive information having a first width via an interface associated with a configurable width, and the read block is to read the information from the storage structures and is to transmit information to a network line.

26 Claims, 9 Drawing Sheets

CONFIGURABLE TRANSMIT AND RECEIVE SYSTEM INTERFACES FOR A NETWORK DEVICE

BACKGROUND

A network device may facilitate an exchange of information in accordance with a network protocol. For example, a network device may transmit and/or receive 52-byte cells of Asynchronous Transfer Mode (ATM) information between the physical layer (PHY) and upper layers in accordance with the Universal Test and Operations PHY Interface for ATM (UTOPIA) interface as defined in ATM Forum document AF-PHY-0017.000 entitled "UTOPIA Specification Level 1, Version 2.01" (March 1994).

Similarly, a network device may transmit and/or receive packets of information, such as variable size Internet Protocol (IP) packets in accordance with a System Packet Interface (SPI) as defined in ATM Forum document AF-PHY-0143.000 entitled "Frame-Based ATM Interface (Level 3)" (March 2000) or in Optical Internetworking Forum document OIF-SP13-01.0 entitled "System Packet Interface Level 3 (SPI-3): OC-48 System Interface for Physical and Link Layer Devices" (June 2000). Moreover, Synchronous Optical Network (SONET) technology may be used to transport IP packets in accordance with the Packets Overt SONET (POS) communication standard as specified in the Internet Engineering Task Force (IETF) Request For Comment (RFC) 1662 entitled "Point to Point Protocol (PPP) in High-level Data Link Control (HDLC)-like Framing" (July 1994) and RFC 2615 entitled "PPP over SONET/Synchronous Digital Hierarchy (SDH)" (June 1999).

By way of example, a network device may receive ATM cells or POS packets via a receive (Rx) network line and transmit the information to a network processor. The network device may also receive ATM cells or POS packets from the network processor and transmit the information via a transmission (Tx) network line. In either case, the interface between the network device and the network processor may have one of a number of different widths (e.g., the interface may have either a 8, 16, 32, or 64-bit width).

Typically, the network device includes circuitry designed to handle a particular network protocol (e.g., ATM cells or POS packets) and/or interface width and rate. Such an approach, however, may not be practical if the network device will support multiple network protocols and/or interface widths (e.g., the network device may need separate circuitry to implement each network protocol and interface width).

DETAILED DESCRIPTION

Figure 1:
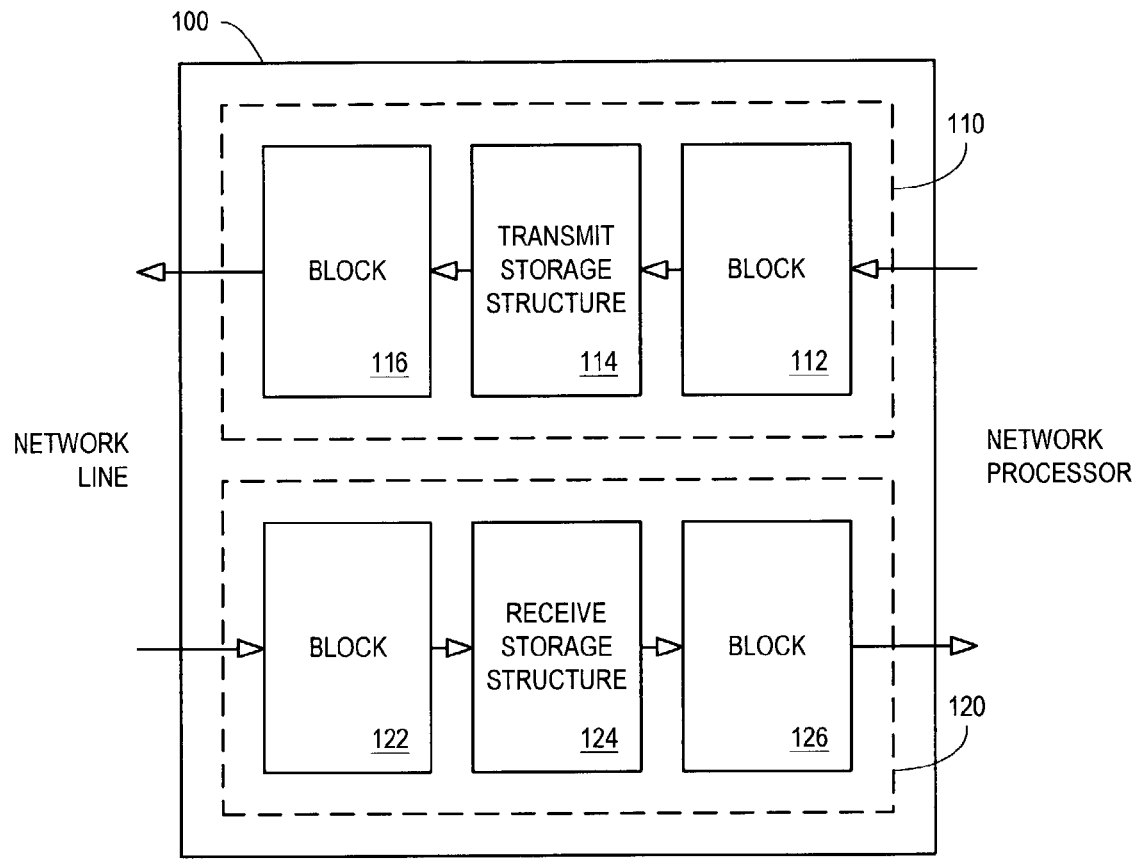
FIG. 1 is a block diagram of a network device according to some embodiments.

FIG. 1 is a block diagram of a network device 100 that, according to some embodiments, facilitates an exchange of information between a network line and a network processor. By way of example, the network device 100 may comprise an INTEL® IXF6012 cell/packet framer that facilitates an exchange of information between an Optical Carrier (OC) level 48 PHY and a network processor (e.g., via a bridge).

To facilitate a transfer of information from the network processor to the network line, the network device 100 includes a transmit system interface 110 to receive information from the network processor via a block 112. The information may be received, for example, via a fixed-length cell-based interface (e.g., a UTOPIA interface) or a variable-length packet-based interface (e.g., associated with SPI signals). Moreover, the information may be received via an interface having a configurable width (e.g., the interface may have a 16-bit or 64-bit width).

The block 112 transfers information into a transmit storage structure 114. The transmit storage structure 114 may comprise, for example, a First-In, First-Out (FIFO) storage structure. According to some embodiments, the block 112 accumulates information if a storage width associated with the transmit storage structure 114 is greater than the width of the interface between the block 112 and the network processor. Consider, for example, a network device 100 that has (i) an 8-bit interface between the block 112 and the network processor and (ii) a transmit storage structure 114 with a 32-bit storage width. In this case, the block 112 might accumulate four 8-bit signals from the network processor before writing the information into the transmit storage structure 114.

According to some embodiments, information is stored in the transmit storage structure 114 in either a first or a second format. For example, the first format may be associated with 52-byte ATM cells while the second format is associated with variable size POS packets.

The transmit system interface 110 also includes a block 116 that reads information from the transmit storage structure 114 and transmits the information to the network line.

To facilitate a transfer of information from the network line to the network processor, the network device 100 includes a receive system interface 120 to receive information from the network line via a block 122. The block 122 also writes information into a receive storage structure 124 (e.g., a FIFO storage structure). According to some embodiments, information is stored in the receive storage structure 124 in either a first or a second format (e.g., associated with ATM cells or POS packets).

The receive system interface 120 also includes a block 126 that reads information from the receive storage structure 124 and transmits information to the network processor (e.g., via an interface having a configurable width). The information may be transmitted, for example, via a fixed-length cell-based interface (e.g., a UTOPIA interface) or a variable-length packet-based interface (e.g., associated with SPI signals).

According to some embodiments, the block 126 serializes information if a storage width associated with the receive storage structure 124 is greater than the width of the interface between the block 126 and the network processor. Consider, for example, a network device 100 that has (i) an 16-bit interface between the block 126 and the network processor and (ii) a receive storage structure 124 with a 32-bit storage width. In this case, the block 126 might read 32-bits of information from the receive storage structure 124 and serialize the information into two sets of 16-bit signals to be transmitted to the network processor.

Figure 2:
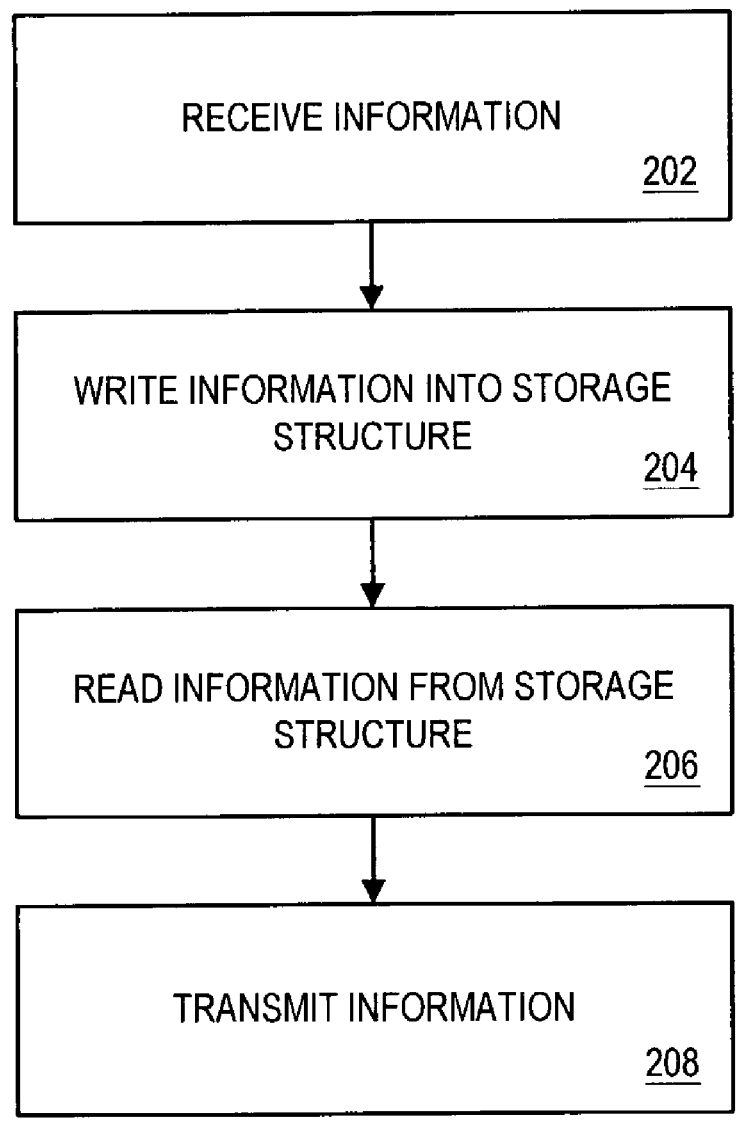
FIG. 2 is a flow chart of a method according to some embodiments.

FIG. 2 is a flow chart of a method according to some embodiments. The flow charts described herein do not imply a fixed order to the actions, and embodiments may be practiced in any order that is practicable. The method may be associated with, for example, the network device 100 illustrated in FIG. 2.

At 202, information is received. The received information may comprise, for example, UTOPIA interface or SPI signals from a network processor or ATM cells or POS packets from a network line. Information is then written into a storage structure (e.g., a FIFO storage structure) at 204 and read from the storage structure at 206. At 208, information is transmitted. The transmitted information may comprise, for example, UTOPIA interface or SPI signals to a network processor or ATM cells or POS packets to a network line.

Transmit System Interface

Figure 3:
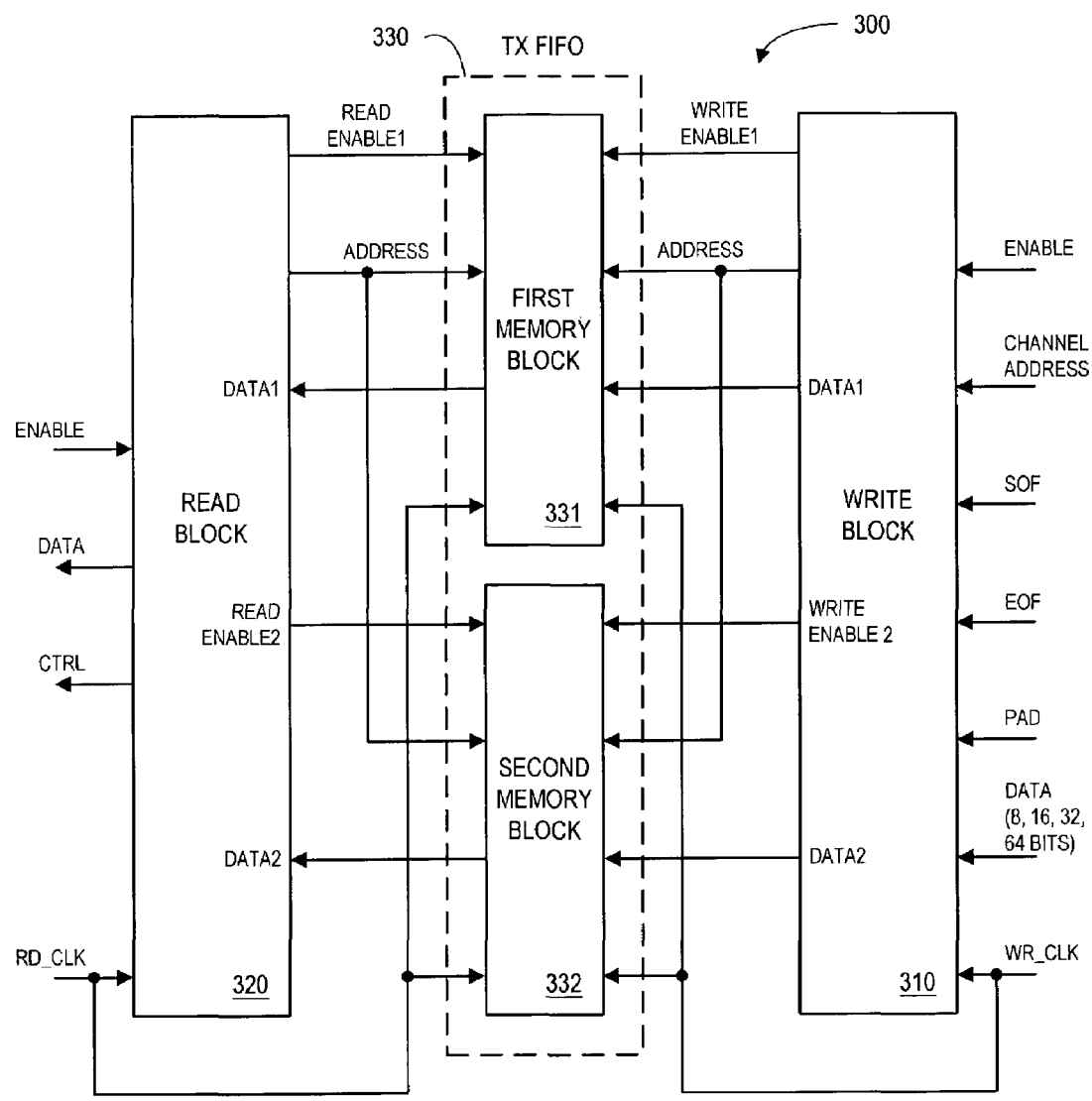
FIG. 3 is a block diagram of a transmit system interface according to some embodiments.

FIG. 3 is a block diagram of a transmit system interface 300 according to some embodiments. As can be seen, the transmit system interface 300 includes a write block 310 to receive UTOPIA interface or SPI signals (e.g., from a network processor). For example, the write block 310 might receive data via an interface having a configurable width of either 8, 16, 32, or 64 bits. The write block 310 may also receive an enable signal, a channel address (e.g., for a multi-channel system), a Start of Frame (SOF) signal, an End of Frame (EOF) signal, and padding (PAD) information.

The transmit system interface 300 transfers information from the write block 310 to a read block 320 via a transmit (Tx) FIFO storage structure 330. In particular, the transmit FIFO storage structure 330 includes two memory blocks 331, 332 (e.g., two 256×37 dual-port memory structures). According to this embodiment, each block 331, 332 has a storage width of 32 bits (e.g., 32 bits of data may be stored along with SOF, EOF, error, and/or padding information)

For example, the write block 310 may store information (DATA1) to the first memory block 331 using a write enable signal (WRITE ENABLE1) and an address signal (ADDRESS). Similarly, the write block 310 may store information (DATA2) to the second memory block 332 using a write enable signal (WRITE ENABLE2) and the address signal.

According to some embodiments, the write block 310 might write information into both the first and second memory blocks 331, 332 at substantially the same time. Consider, for example, the case where the configurable width between the write block 310 and the network processor is 64 bits. In this case, the write block 310 may receive 64 bits of information from the network processor and store the information into both the first and second memory blocks 331, 332 at substantially the same time (e.g., using WRITE ENABLE1 and WRITE ENABLE2).

In other cases, however, the write block 310 may write information into the first or second memory blocks 331, 332 alternately. For example, when the configurable width between the write block 310 and the network processor is 32 bits, the write block 310 may receive 32 bits of information from the network processor and store the information into the first memory block 331 (e.g., using WRITE ENABLE1). The next 32 bits of information from the network processor would then be stored in the second memory block 332 (e.g., using WRITE ENABLE2).

Moreover, according to some embodiments the write block 310 may accumulate information before it is stored in the transmit FIFO storage structure 330. For example, when the configurable width between the write block 310 and the network processor is 8 bits, the write block 310 may receive four sets of 8-bit signals from the network processor before storing the information (e.g., into the first or second memory block 332 alternately).

The read block 320 then reads information from the transmit FIFO storage structure 330 (e.g., from the first or second memory block 331, 332 alternately). For example, the read block 320 may use a READ ENABLE1 and an ADDRESS signal to read DATA1 from the first memory block 331. Similarly, the read block 320 may use a READ ENABLE2 and the ADDRESS signal to read DATA2 from the second memory block 320. The read block 320 may then transmit data to the network line (e.g., DATA and CTRL signals may be transmitted in accordance with an ENABLE signal).

According to some embodiments, the write block 310 and the read block 320 receive independent clock signals (e.g., the clocks might not have a base frequency or phase relationship). For example, the clock that the system interface side receives (i.e., WR_CLK) might be associated with a system interface clock while the clock that line side receives (i.e., RD_CLK) is associated with a line rate and device mode.

Transmit System Method

Figure 4:
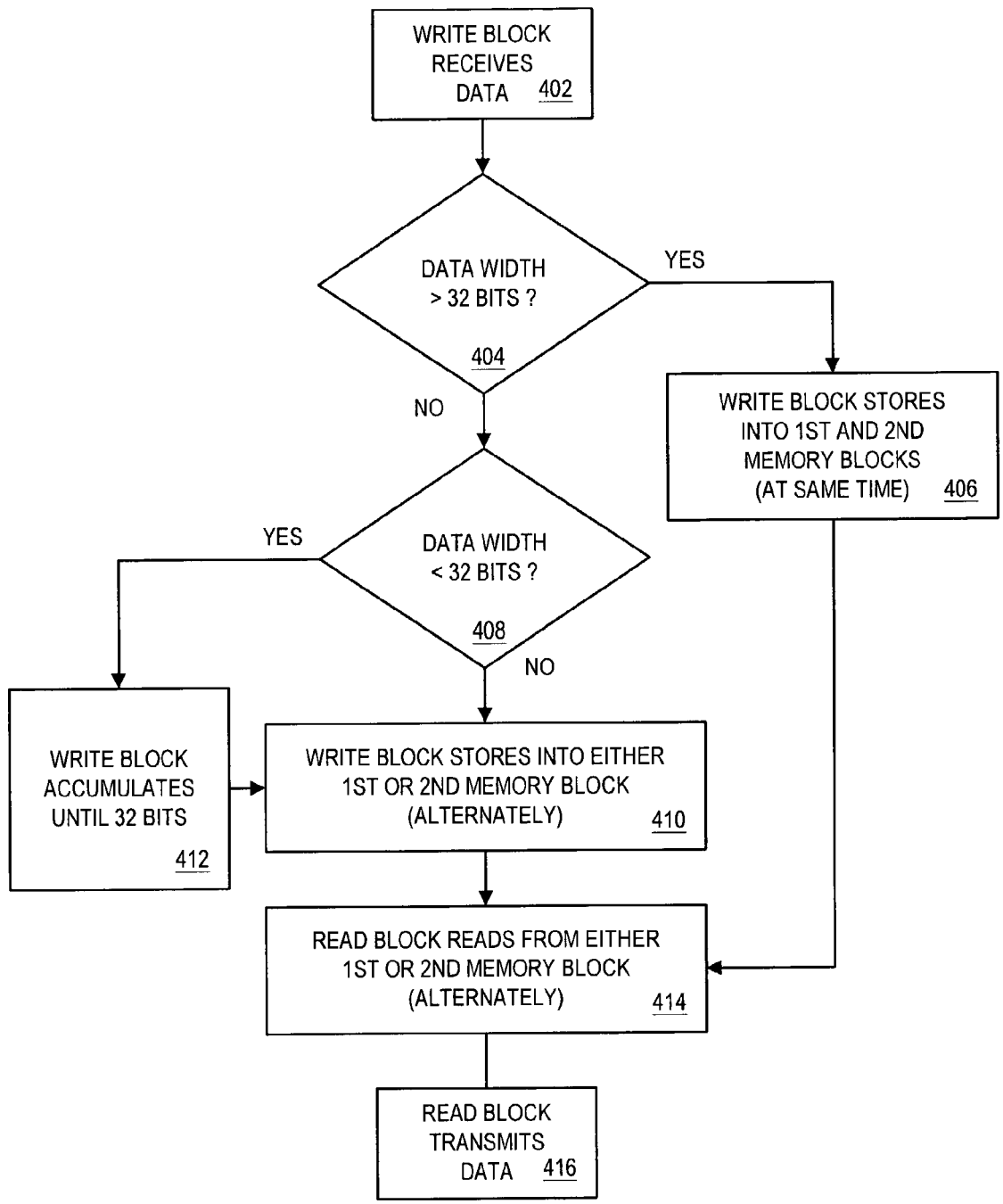
FIG. 4 is a flow chart of a method of transmitting information according to some embodiments.

FIG. 4 is a flow chart of a method of transmitting information according to some embodiments. In particular, the method is associated with the transmit system interface 300 described with respect to FIG. 3. At 402, the write block 310 receives data. The received data may be associated with, for example, ATM cells or POS packets. Moreover, the data may be received via an interface having a configurable width (e.g., of either 8, 16, 32, or 64 bits).

If the width of received data is greater than 32 bits at 404 (i.e., greater than the storage width of each memory block 331, 332), then the write block 310 stores information into both memory blocks 331, 332 at the same (or substantially the same) time at 406.

If the width of received data is not less than 32 bits at 408 (i.e., not less than the storage width of each memory block 331, 332), then the write block 310 stores information into either the first memory block 331 or the second memory block 332 alternately at 410. If the width of received data is less than 32 bits at 408, then the write block 310 accumulates information at 412 before storing information at 410.

After information is stored into the first and/or second memory block 331, 332, the read block 320 reads information from either the first memory block 331 or the second memory block 332 alternately. The read block 320 then transmits data at 416 (e.g., to the network line).

Receive System Interface

Figure 5:
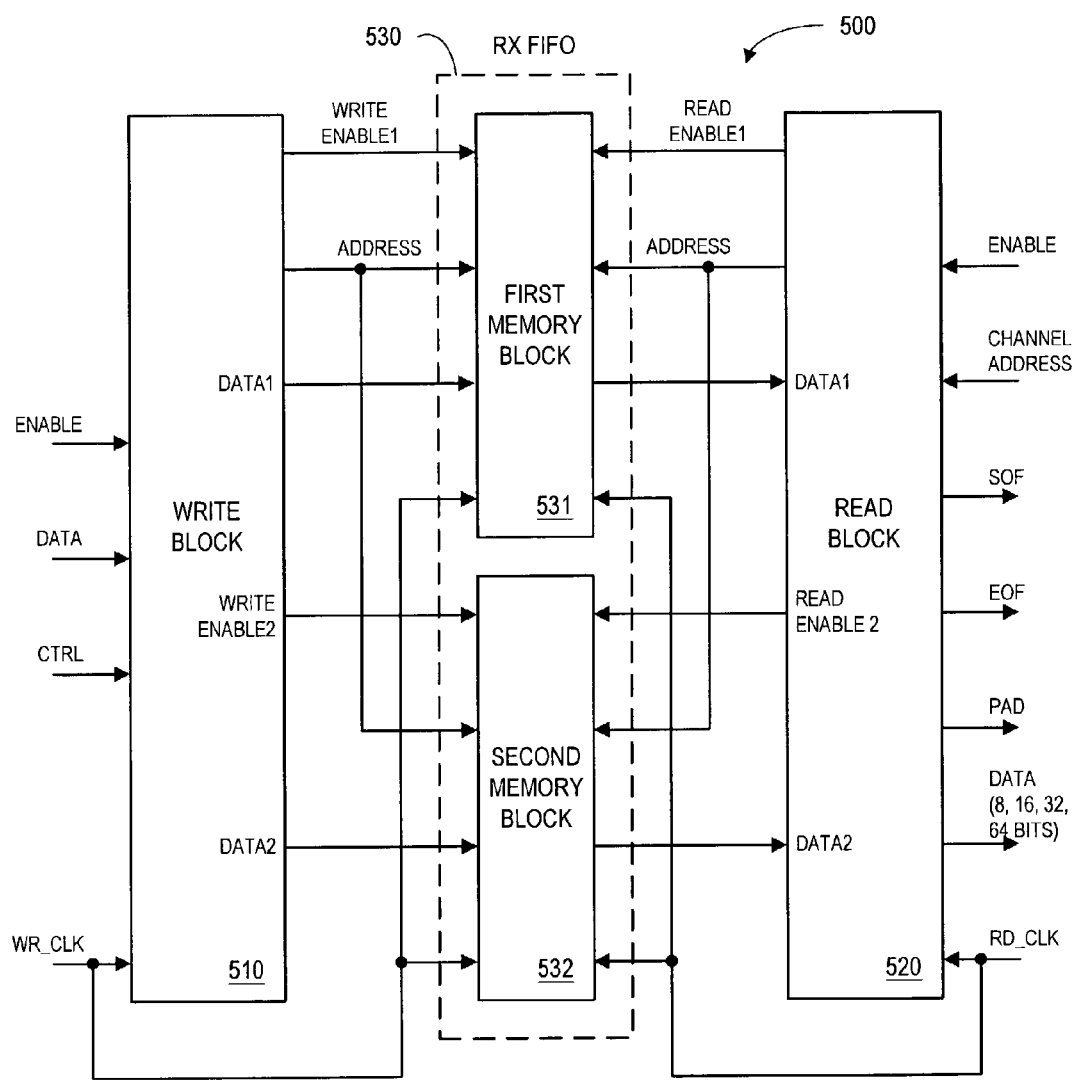
FIG. 5 is a block diagram of a receive system interface according to some embodiments.

FIG. 5 is a block diagram of a receive system interface 500 according to some embodiments. As can be seen, the receive system interface 500 includes a write block 510 to receive ENABLE, DATA, and CTRL signals (e.g., from a network line).

The receive system interface 500 transfers information from the write block 510 to a read block 520 via a receive (Rx) FIFO storage structure 530. In particular, the receive FIFO storage structure 530 includes two memory blocks 531, 532 (e.g., two 256×37 dual-port memory structures). According to this embodiment, each block 531, 532 has a storage width of 32 bits (e.g., 32 bits of data may be stored along with SOF, EOF, error, and/or padding information)

According to some embodiments, the write block 510 receives information from the network line and writes information into either the first or second memory block 531, 532 alternately. For example, the write block 510 may store information (DATA1) to the first memory block 531 using a write enable signal (WRITE ENABLE 1) and an address signal (ADDRESS). Similarly, the write block 510 may store information (DATA2) to the second memory block 532 using a write enable signal (WRITE ENABLE2) and the address signal.

The read block 520 reads information from the receive FIFO storage structure 530 and transmits information (e.g., to a network processor). For example, the read block 520 might transmit data via an interface having a configurable width of either 8, 16, 32, or 64 bits. The read block 520 may also transmit a Start of Frame (SOF) signal, an End of Frame (EOF) signal, and padding (PAD) information and receive an enable signal and a channel address (e.g., for a multi-channel system).

According to some embodiments, the read block 520 might read information from both the first and second memory blocks 531, 532 at substantially the same time. Consider, for example, the case where the configurable width between the read block 520 and the network processor is 64 bits. In this case, the read block 520 may read information from both the first and second memory blocks 531, 532 at substantially the same time (e.g., using READ ENABLE1 and READ ENABLE2) and transmit the entire 64 bits of information to the network processor.

In other cases, however, the read block 520 may read information from the first or second memory blocks 531, 532 alternately. For example, when the configurable width between the read block 520 and the network processor is 32 bits, the read block 520 may read 32 bits of information from the first memory block 531 (e.g., using READ ENABLE 1) and transmit the information to the network processor. The read block 520 would then read the next 32 bits of information from the second memory block 532 (e.g., using WRITE ENABLE2).

Moreover, according to some embodiments the read block 520 may serialize information before it is transmitted. For example, when the configurable width between the read block 520 and the network processor is 8 bits, the read block 520 may read 32 bits of information from the first memory block 531 and serialize the information into four sets of 8-bit signals to be transmitted to the network processor.

According to some embodiments, the write block 510 and the read block 520 receive independent clock signals (e.g., the clocks might not have a base frequency or phase relationship). For example, the clock that the system interface side receives (i.e., RD_CLK) might be associated with a system interface clock while the clock that line side receives (i.e., WR_CLK) is associated with a line rate and device mode.

Receive System Method

Figure 6:
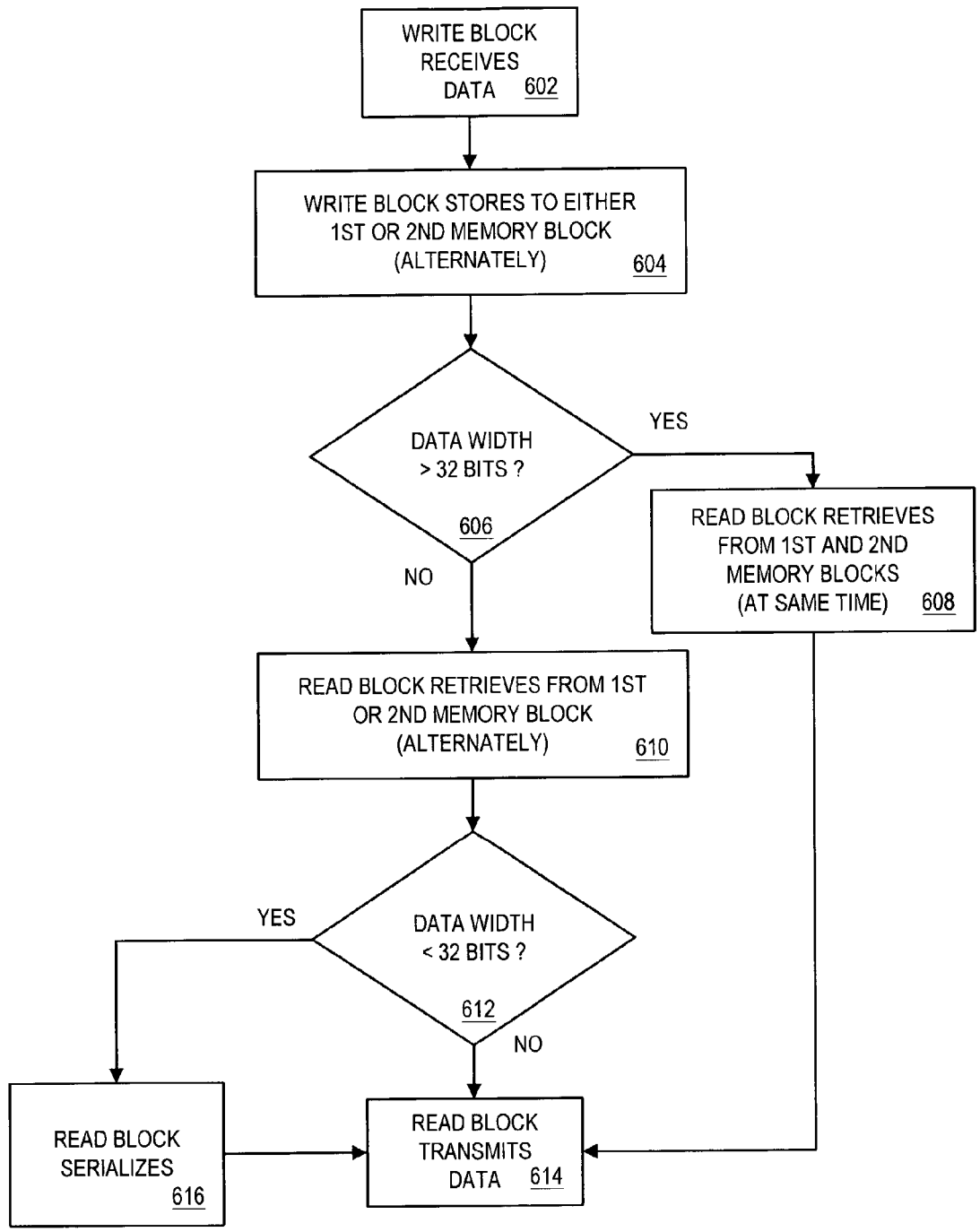
FIG. 6 is a flow chart of a method of receiving information according to some embodiments.

FIG. 6 is a flow chart of a method of receiving information according to some embodiments. In particular, the method is associated with the receive system interface 500 described with respect to FIG. 5.

At 602, the write block 510 receives information. For example, the write block 510 may receive ATM cells or POS packets from the network line. The write block 510 then stores information to either first or second memory block 531, 532 alternately at 604.

If the configurable width of the interface between the read block 520 and the network processor is greater than 32 bits (i.e., greater than the storage width of each memory block 531, 532) at 606, then the read block 520 retrieves information from both the first and second memory block 520 at the same (or substantially the same) time at 608.

If the configurable width of the interface between the read block 520 and the network processor is not greater than 32 bits at 606, then the read block 520 retrieves information from the first memory block 531 or the second memory block 532 alternately at 610. Moreover, if the configurable width of the interface between the read block 520 and the network processor is less than 32 bits at 612, then the read block 520 serializes the information at 616.

The read block 520 then transmits data at 614. For example, the read block 520 may transmit ATM cells or POS packets to a network processor along with SOF, EOF, and PAD signals.

Memory Block Formats

Figure 7:
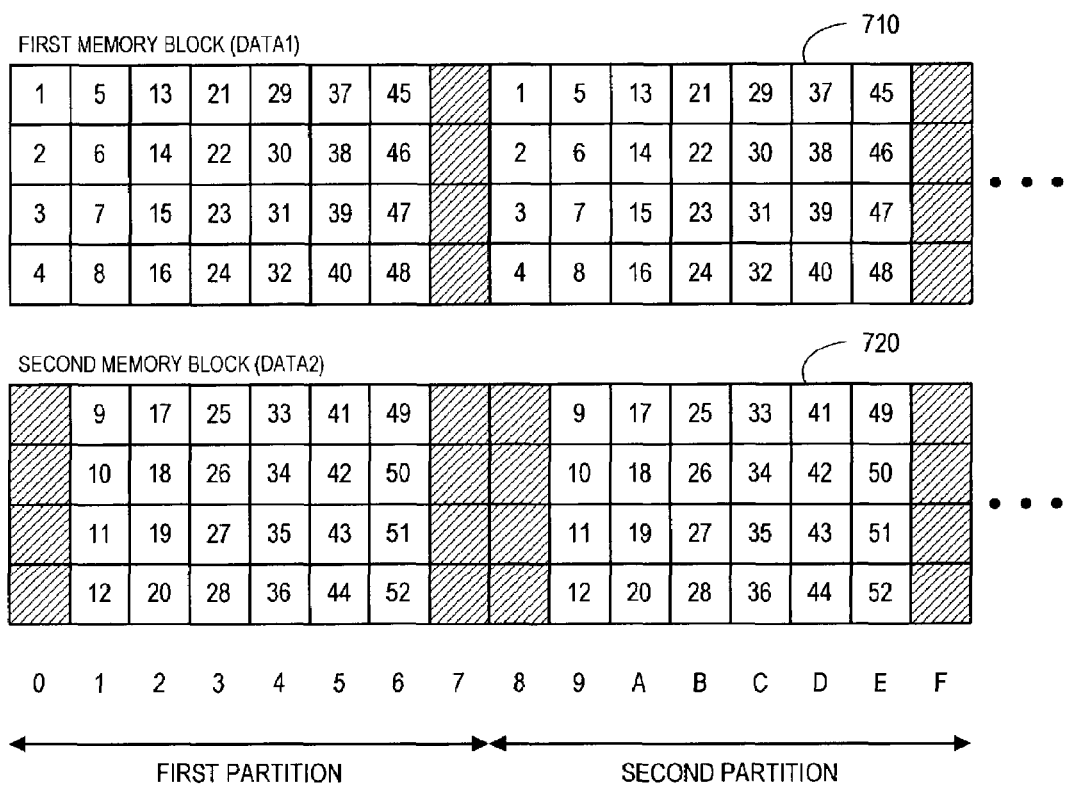
FIG. 7 illustrates memory blocks storing ATM cell information according to some embodiments.

According to some embodiments, information in a transmit or receive FIFO storage structure may have either a first or a second format. For example, the first format may be associated with ATM cells while the second format is associated with POS packets. FIG. 7 illustrates memory blocks 710, 720 storing ATM cell information. The memory blocks 710, 720 may be associated with, for example, the memory blocks 331, 332 illustrated in FIG. 3 and/or the memory blocks 531, 532 illustrated in FIG. 5. Note that unused portions of the memory blocks 710, 720 are represented with cross-hatching.

As can be seen, the first eight addresses of the first memory block 710 (i.e., DATA 1) and the second memory block 720 (i.e., DATA2) form a 16-word partition that stores a single 52-byte ATM cell (e.g., address 3 of the second memory block 720 stores bytes 25 through 28 of the ATM cell). Similarly, the next eight addresses (i.e., addresses 8 through F) of the two blocks 710, 720 form another partition that stores the next 52-byte ATM cell. Note that an ATM cell may actually have 53 bytes when it is transmitted. According to some embodiments, one of the 53 bytes representing a Header Error Control (HEC) field is generated by the network device 100. As a result, only 52 bytes are stored in the memory blocks 710, 720. According to another embodiment, however, all 53 bytes of an ATM cell are stored in the memory blocks 710, 720.

Figure 8:
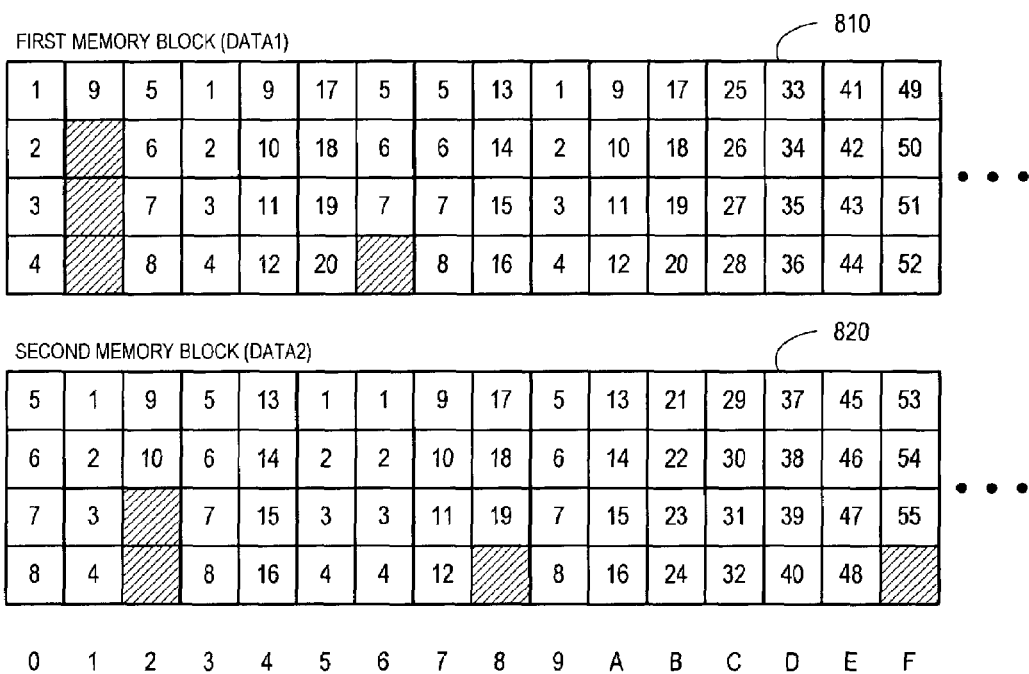
FIG. 8 illustrates memory blocks storing POS packet information according to some embodiments.

FIG. 8 illustrates memory blocks 810, 820 storing variable size POS packet information (i.e., IP packets having 9, 10, 20, 7, 16, 19 and 55 bytes). As can be seen, for example, the 7-byte IP packet is stored beginning at address 5 of the second memory block 820 through address 6 of the first memory block 810.

Pointer Processing

According to some embodiments, a transmit or receive FIFO storage structure is associated with (i) a "read pointer" maintained by the read block and (ii) a "write pointer" maintained by the write block. Moreover, the read pointer and/or the write pointer may be updated according to either a first rule associated with ATM cells or a second rule associated with POS packets.

Consider, for example, the transmit system interface 300 illustrated in FIG. 3. In this case, the read block 320 may maintain the read pointer to keep track of where the last word was read from the FIFO storage structure 330 (e.g., the read pointer may indicate the appropriate address and memory block).

Similarly, the write block 310 may maintain the write pointer to keep track of where the next word will be written into the FIFO storage structure 330 (e.g., the write pointer may indicate the next address and memory block).

Figure 9:
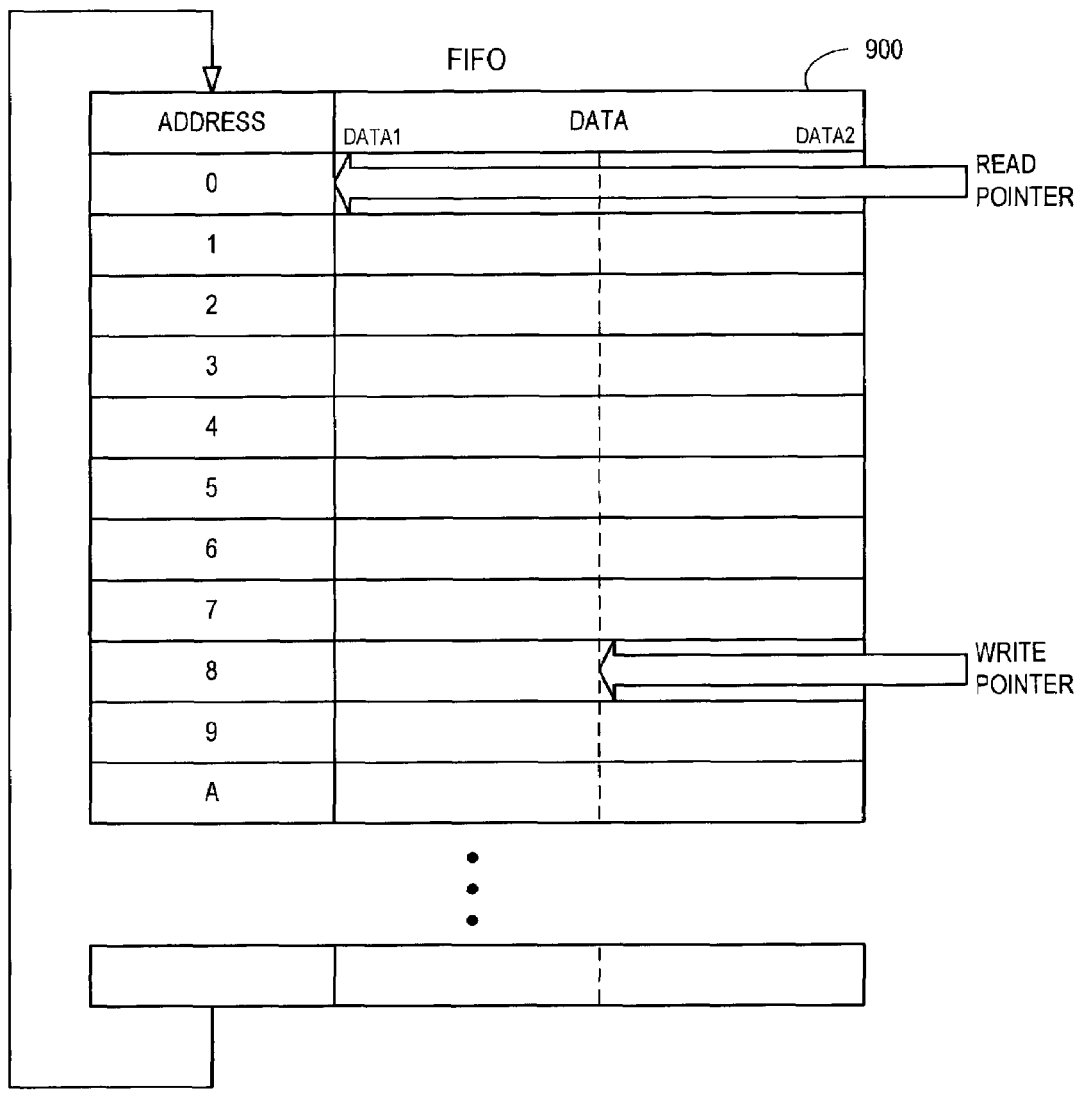
FIG. 9 illustrates a first-in, first-out storage structure according to some embodiments.

FIG. 9 illustrates a FIFO storage structure 900 according to some embodiments. Note that the pointers are incremented in a circular way (e.g., after a pointer reaches the end of the FIFO storage structure 900 it is returned to the start of the FIFO storage structure 900). Moreover, when the read pointer and the write pointer are equal, the FIFO storage structure 900 is empty.

Pointer Processing—ATM Mode

In ATM mode, the write block may transmit to the read block an indication associated with the current write pointer.

Moreover, the read block may transmit to the write block an indication associated with the current read pointer. These indications may, for example, be converted to gray code before being exchanged (e.g., to support different clock frequencies on the read and write sides of the FIFO storage structure). According to some embodiments, only an indication of the current partition is exchanged between the write block and the read block (e.g., because each partition always contains an entire ATM cell).

When the read pointer reaches the end of an ATM cell (i.e., the seventh 64-bit word in a partition), the read pointer is moved to the start of the next partition. That is, the eighth word may be skipped because the ATM cell format (e.g., as described with respect to FIG. 7) does not store valid information in the eighth word of a partition.

Moreover, when the write pointer reaches the end of an ATM cell and the read pointer is not pointing to the next partition, the write pointer is moved to the start of the next partition. When the write pointer reaches the end of an ATM cell and the read pointer is pointing to the next partition, the write pointer is moved to the last word of the partition that was already been read (i.e., the eighth word of the partition).

Pointer Processing—POS Mode

In POS mode, the write block may transmit to the read block an indication associated with the current write pointer. Moreover, the read block may transmit to the write block an indication associated with the current read pointer. These indications may, for example, be converted to gray code before being exchanged (e.g., to support different clock frequencies on the read and write sides of the FIFO storage structure). According to some embodiments, only the address portion of the pointers are exchanged when the data width is configured to be 64 bits (e.g., because both memory blocks are being accessed at the same time). When the data width is 32 bits or less, both the address and memory selection are exchanged.

The write pointer is incremented only when the FIFO storage structure 900 is not full (i.e., when the write pointer is not pointing to the address immediately preceding the address currently pointed to by the read pointer).

When the data width is 64 bits, both memory blocks are written to at the same time. The write pointer is simply incremented to the next address (assuming the FIFO storage structure 900 is not full) and the memory selection is not needed.

When the data width is 32 bits or less, the memory blocks are being written to alternately. As a result, the memory selection is incremented (e.g., from the first memory block to the second memory block). After the second memory block is accessed, the address is incremented and the memory selection is reset to the first memory block.

According to some embodiments, at least some of the circuitry that implements the pointer processing and FIFO status indications are shared between the ATM and POS modes.

ADDITIONAL EMBODIMENTS

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although embodiments have been described wherein a transmit or receive FIFO storage structure is formed from two memory blocks, the FIFO storage structure may be formed from any other number of memory blocks. For example, four memory blocks may be used (e.g., and a read or write block might access one, two, or all four of the memory blocks at the same time). Moreover, a single memory block may be provided in accordance with some embodiments.

In addition, although particular network protocols and configurable data widths have been described, other network protocols and/or data widths may be implemented.

The several embodiments described herein are solely for the purpose of illustration. Persons skilled in the art will recognize from this description other embodiments may be practiced with modifications and alterations limited only by the claims.

What is claimed is:

1. An apparatus, comprising:
a plurality of transmit storage structures each being associated with a storage width;
a write block to receive information having a first width via an interface associated with a configurable width, wherein the write block is to:
write a first portion of the information into a first storage structure and is to write a second portion of the information into a second storage structure at the same time, without writing any of the first portion into the second storage structure, when the width of the interface is greater than the storage width, wherein the write block comprises an address signal line to send an address to the first storage structure and the second storage structure, a first write enable signal line to send an enable signal to the first storage structure and a second write enable signal line to send a second enable signal to the second storage structure; and
accumulate the first portion and a second portion before writing the first portion and the second portion of the information when the width of the interface is less than the storage width,
wherein the first portion has a second width, wherein the second portion does not include any of the first portion and has the second width, and wherein the second width is smaller than the first width; and
a read block to read the information from the storage structures and to transmit information to a network line.

2. The apparatus of claim 1, wherein the write block is to accumulate information received via the interface when the width of the interface is less than the storage width.

3. The apparatus of claim 1, wherein the write block is to write information into a sequentially selected storage structure when the width of the interface is not greater than the storage width.

4. The apparatus of claim 1, wherein each storage structure comprises a dual-port memory.

5. The apparatus of claim 1, wherein the storage structures comprise a FIFO storage structure.

6. The apparatus of claim 5, wherein information in the FIFO storage structure may have either a first or a second format.

7. The apparatus of claim 6, wherein the first format is associated with fixed-length cells and the second format is associated with variable-length packets.

8. The apparatus of claim 7, wherein the first format comprises a plurality of partitions, each partition being associated with a fixed-length cell.

9. The apparatus of claim 5, wherein the FIFO storage structure is associated with (i) a read pointer maintained by the read block and (ii) a write pointer maintained by the write block.

10. The apparatus of claim 9, wherein at least one of the read pointer and the write pointer are updated according to either a first rule associated with fixed-length cells or a second rule associated with variable-length packets.

11. The apparatus of claim 9, wherein (i) the read block is to provide an indication of the read pointer to the write block and (ii) the write block is to provide an indication of the write pointer to the read block.

12. The apparatus of claim 11, wherein the indications are associated with gray code.

13. The apparatus of claim 1, wherein the write block and the read block receive independent clock signals.

14. The apparatus of claim 1, wherein the apparatus comprises a configurable cell/packet framer adapted to facilitate an exchange of information between a network processor and the network line.

15. The apparatus of claim 1, wherein information in the storage structures may be associated with either a fixed-length cell or a variable-length packet.

16. The apparatus of claim 1, wherein the write block may receive signals from either a fixed-length cell-based interface or a variable-length packet-based interface.

17. A method, comprising:
receiving information at a write block having a first width via an interface associated with a configurable width, wherein the write block comprises an address signal line to send an address to a first transmit storage structure of a plurality of transmit storage structures and a second transmit storage structure, a first write enable signal line to send an enable signal to the first transmit storage structure and a second write enable signal line to send a second enable signal to the second transmit storage structures;
if the width of the interface is greater than a storage width associated with each of the plurality of transmit storage structures, write a first portion of the information into the first storage structure and write a second portion of the information into the second storage structure at the same time, without writing any of the first portion into the second storage structure, when the width of the interface is greater than the storage width, and is to accumulate the first portion and a second portion before writing the first portion and the second portion of the information when the width of the interface is less than the storage width, wherein the first portion has a second width, wherein the second portion does not include any of the first portion and has the second width, and wherein the second width is smaller than the first width; and
if the width of the interface is not greater than the storage width, writing information into a sequentially selected storage structure.

18. The method of claim 17, further comprising:
transferring information from the storage structures to a read block; and
transmitting information from the read block to a network line.

19. The method of claim 17, further comprising:
accumulating information at the write block when the width of the interface is less than the storage width.

20. An apparatus, comprising:
a plurality of receive storage structures each having a storage width;
a write block to receive information having a first width from a network line and to write information into the storage structures, wherein the write block comprises an address signal line to send an address to a first of the plurality of receive storage structures and a second of the plurality of receive storage structures, a first write enable signal line to send an enable signal to a first storage structure, a second write enable signal line to send a second enable signal to a second storage structure, a first data line to send first data to the first storage structure, and a second data line to send second data to the second memory structure, without sending any of the first data into the second memory structure,; and
a read block to read information from the storage structures and to transmit information via an interface having a configurable width, wherein the read block is to read information from more than one of the storage structures at the same time when the width of the interface is greater than the storage width, and
wherein the read block is to read information from more than one storage structures after the write block is to accumulate a first portion and a second portion before writing the first portion and the second portion of the information when the width of the interface is less than the storage width, wherein the first portion has a second width, wherein the second portion has the second width, and wherein the second width is smaller than the first width.

21. The apparatus of claim 20, wherein the read block is to serialize information read from the storage structures when the width of the interface is less than the storage width.

22. The apparatus of claim 20, wherein the read block is to read information from a sequentially selected storage structure when the width of the interface is not greater than the storage width.

23. The apparatus of claim 20, wherein the apparatus comprises a configurable cell/packet framer adapted to facilitate an exchange of information between a network processor and the network line.

24. The apparatus of claim 20, wherein information in the storage structures may be associated with either a fixed-length cell or a variable-length packet.

25. An apparatus, comprising:
a network processor; and
a configurable cell/packet framer, comprising:
a first block to exchange information via a network line;
a second block to exchange information with the network processor via a system interface; and
a plurality of storage structures accessible by the first block and the second block, wherein the plurality of storage structures may store information having a first width via an interface associated with a configurable width, wherein the first block is to write a first portion of the information into a first storage structure and is to write a second portion of the information into a second storage structure at the same time, without writing any of the first portion into the second storage structure, when the width of the interface is greater than a storage width, and is to write a first portion of the information into a first storage structure and is to accumulate a first portion and a second portion before writing the first portion and the second portion of the information when the width of the interface is less than the storage width, wherein the first portion has a second width, wherein the second portion has the second width, wherein the second width is smaller than the first width, and wherein the write block comprises an address signal line to send an address to the first storage structure and the second storage structure, a first write enable signal line to send an enable signal to a first storage structure and a second write enable signal line to send a second enable signal to a second storage structure, and wherein the plurality of storage structures may store information in either a first format associated with ATM cells or a second format associated with POS packets.

26. The apparatus of claim 25, wherein the storage structure has a write pointer and a read pointer and wherein at least one of the write pointer and the read pointer are updated according to either a first rule associated with ATM cells or a second rule associated with POS packets.

* * * * *